US008208806B2

(12) United States Patent
Chiang

(10) Patent No.: US 8,208,806 B2
(45) Date of Patent: Jun. 26, 2012

(54) CAMERA MODULE FOR CAPTURING PANORAMIC IMAGE

(75) Inventor: Shun-Fan Chiang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/876,251

(22) Filed: Sep. 7, 2010

(65) Prior Publication Data

US 2011/0176796 A1 Jul. 21, 2011

(30) Foreign Application Priority Data

Jan. 15, 2010 (CN) .......................... 2010 1 0300356

(51) Int. Cl.
*G03B 41/00* (2006.01)
(52) U.S. Cl. ....................... 396/336; 359/557; 396/329
(58) Field of Classification Search ................. 396/335, 396/336, 329; 348/36–40, 219.1; 359/557
See application file for complete search history.

(56) References Cited

U.S. PATENT DOCUMENTS

| 7,804,645 B2 * | 9/2010 | Morita et al. | 359/554 |
| 2005/0264656 A1 * | 12/2005 | Seo et al. | 348/219.1 |
| 2010/0020190 A1 * | 1/2010 | Kawakatsu et al. | 348/222.1 |
| 2010/0079660 A1 * | 4/2010 | Ugawa et al. | 348/360 |
| 2010/0134887 A1 * | 6/2010 | Shin | 359/557 |
| 2010/0158500 A1 * | 6/2010 | Zhang | 396/439 |
| 2011/0085060 A1 * | 4/2011 | Liu | 348/239 |
| 2011/0158616 A1 * | 6/2011 | Chiang | 396/55 |

FOREIGN PATENT DOCUMENTS

JP 2009288769 A * 12/2009

OTHER PUBLICATIONS machine translation of jp2009-288769a.*

* cited by examiner

*Primary Examiner* — Rodney Fuller
*Assistant Examiner* — Linda B Smith
(74) *Attorney, Agent, or Firm* — Altis Law Group, Inc.

(57) ABSTRACT

A camera module includes an image capturing member, a movable member, a first magnet, a second magnet, and an electromagnetic coil. The image capturing member is configured for capturing images, and has an optical axis. The movable member receives the image capturing member, and is rotatable about a rotation axis substantially perpendicular to the optical axis of the image capturing member. The first magnet and a second magnet are respectively fixed to opposite sides of the movable member. The first magnet and the second magnet are respectively arranged at opposite sides of the optical axis and at opposite sides of the rotation axis. The electromagnetic coil is wrapped around the first and second magnets for acting upon the first and second magnets, thereby producing a magnetic force to drive the movable member to rotate about the rotation axis.

20 Claims, 4 Drawing Sheets

CAMERA MODULE FOR CAPTURING PANORAMIC IMAGE

BACKGROUND

1. Technical Field

The present disclosure relates to camera modules, and particularly to a camera module capable of capturing panoramic images.

2. Description of Related Art

With the rapid development of electronic technology, camera modules have been applied in workplaces, vehicles, and in portable electronic devices (see "Digital Image Indexing Using Secret Sharing Schemes: A Unified Framework For Single-Sensor Consumer Electronics", IEEE Transactions on Consumer Electronics, Vol. 51, No. 3, August 2005).

Often, a camera module includes a holder, a barrel received in the holder, and optical elements received in the barrel. The optical elements may include optical lenses and infrared-ray-cut (IR-cut) filters, for example. An image sensor is mounted at the bottom of the holder. The image sensor is optically coupled with the optical lenses.

At present, the camera modules of digital still cameras and digital video cameras are most often immovably mounted in the main body of the camera, limiting the shooting angle of the camera modules. Although wide-angle lenses can be applied in the camera module, user demands are only partially met.

Therefore, a camera module with a wide shooting angle is desired.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Reference will now be made to the drawings to describe preferred embodiments of the present camera module.

Figure 1:
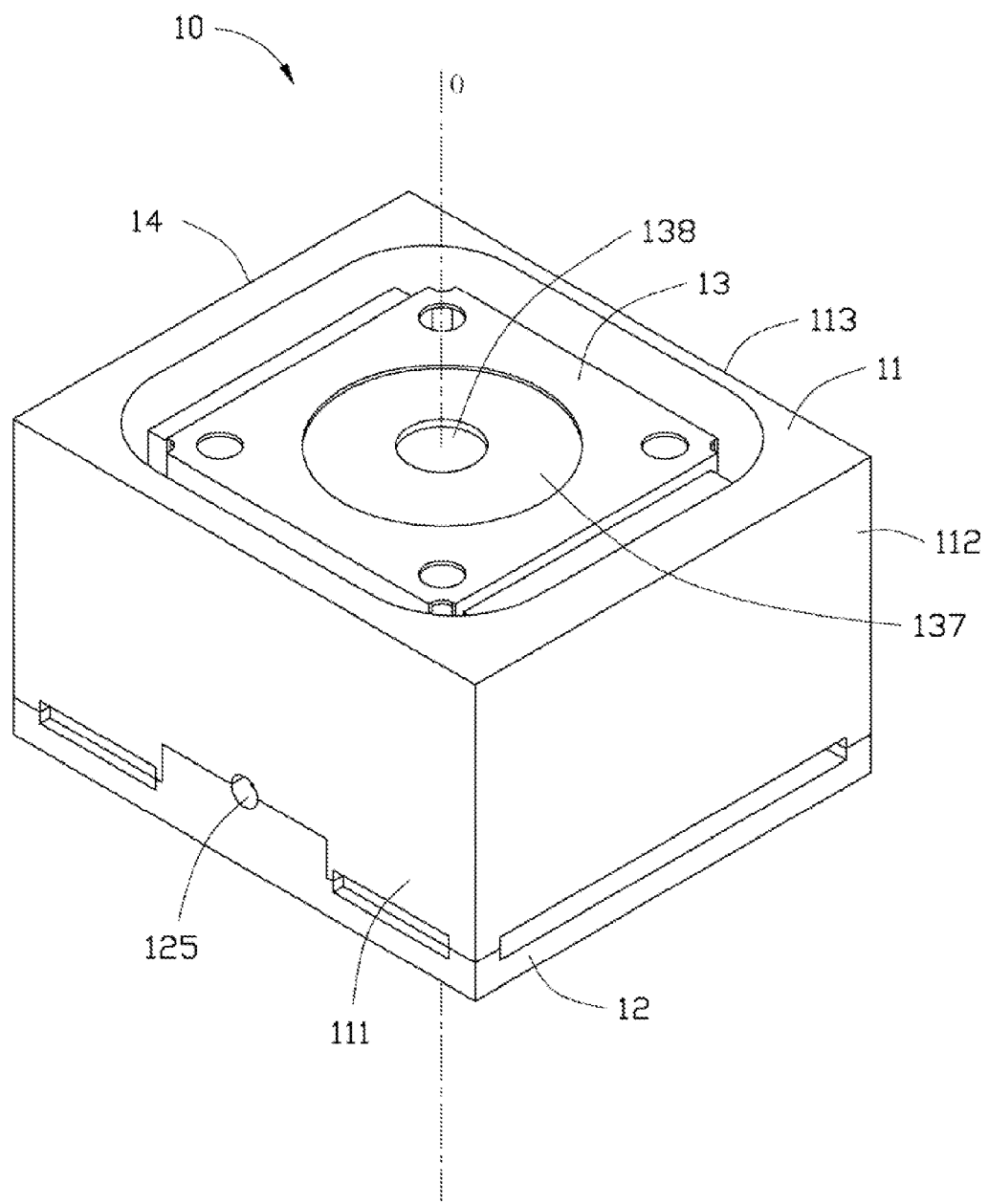
FIG. 1 is a schematic, assembled view of a camera module in accordance with a first exemplary embodiment.
Figure 2:
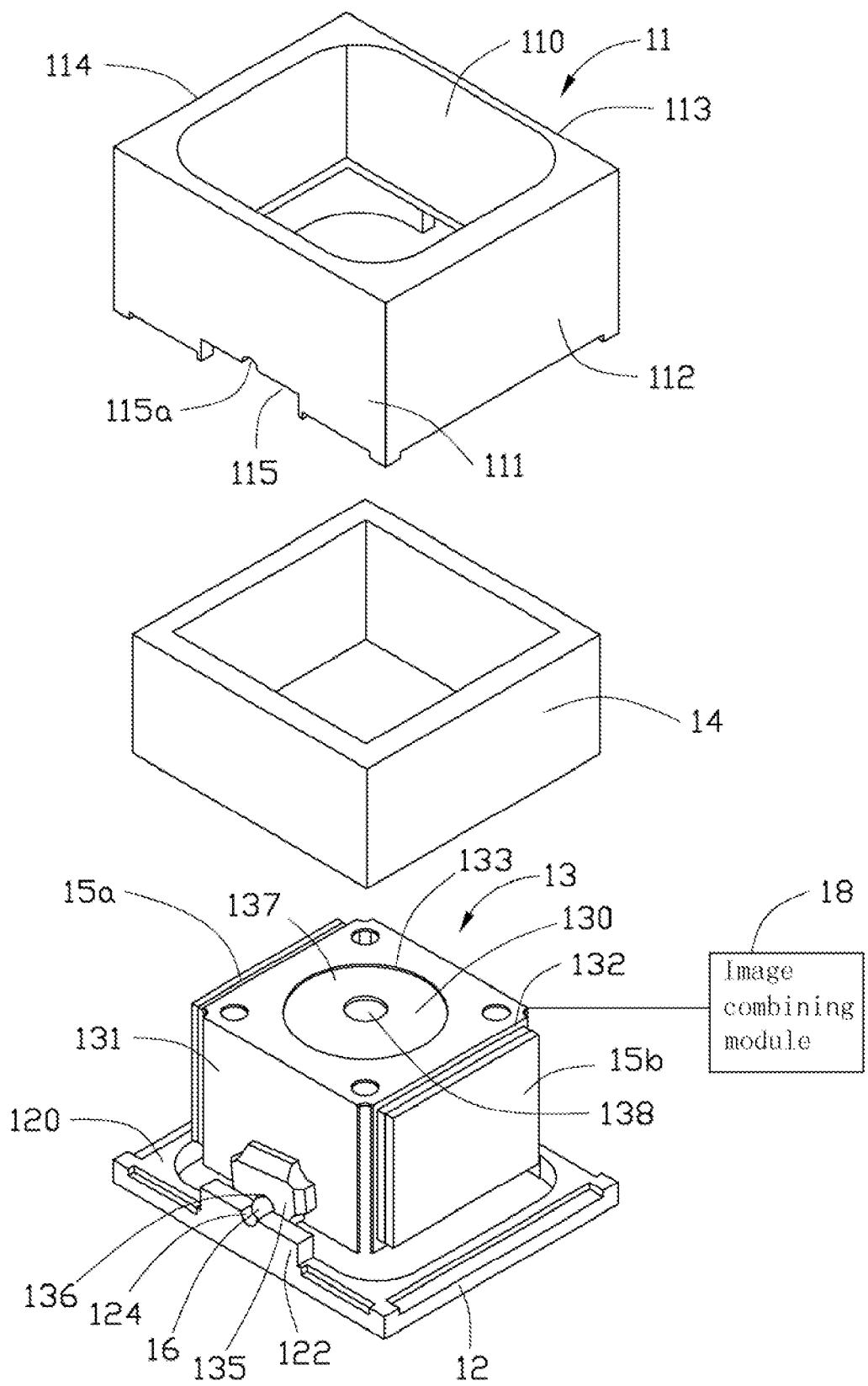
FIG. 2 is a schematic, disassembled view of the camera module in FIG. 1.
Figure 3:
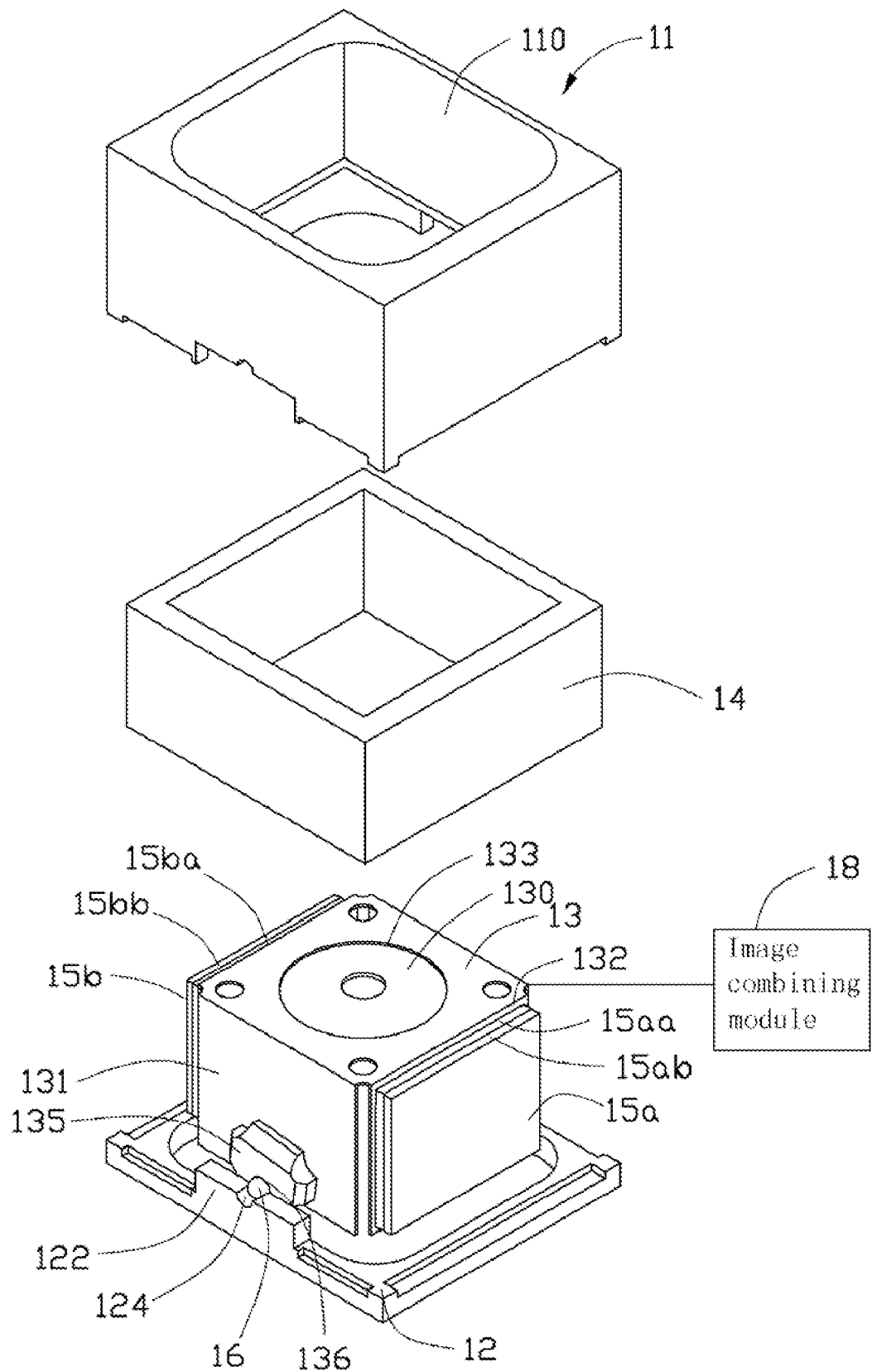
FIG. 3 is similar to FIG. 2 but viewed from a different angle.
Figure 4:
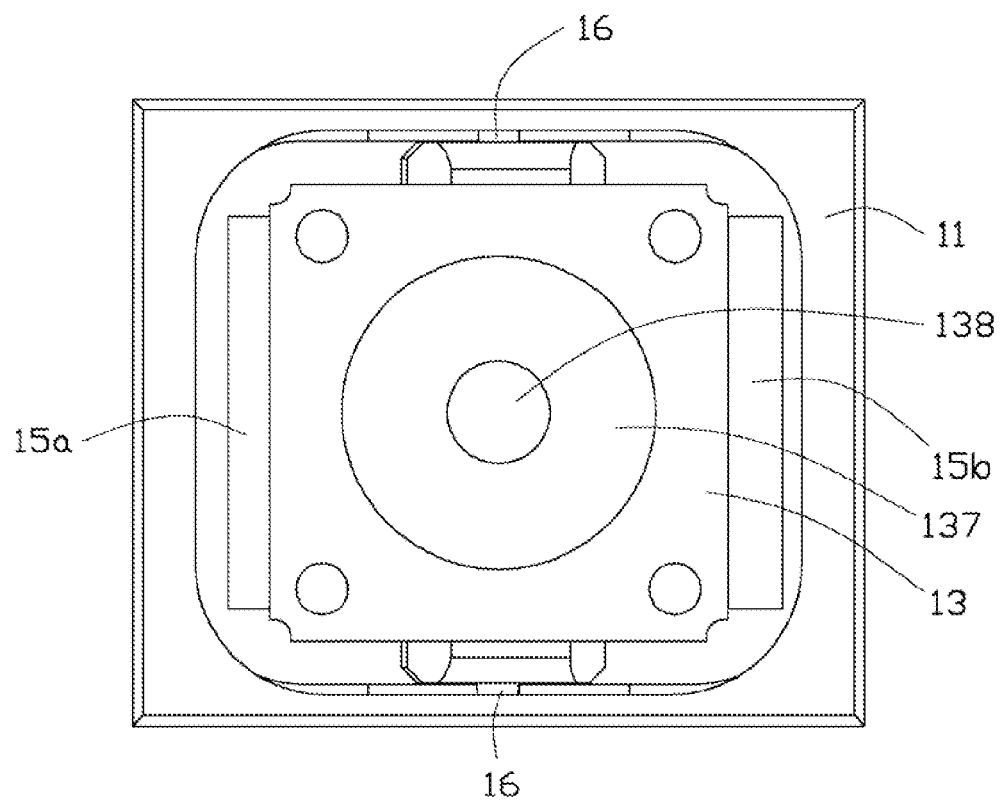
FIG. 4 is a top view of the camera module in FIG. 1.

Referring to FIGS. 1 to 4, a camera module 10 in accordance with an exemplary embodiment includes a receiving member 11, a base 12, a movable member 13, an electromagnetic coil 14, and an image combining module 18. The movable member 13 and the electromagnetic coil 14 are accommodated in the receiving member 11. The base 12 is fixed to one end of the receiving member 11.

The receiving member 11 includes four sidewalls 111, 112, 113, and 114 connected end to end. The four sidewalls 111, 112, 113, and 114 cooperatively form a substantially cubiform through hole 110. The sidewall 111 is arranged facing the sidewall 113. The sidewall 112 is arranged facing the sidewall 114. The sidewalls 111 and 113 each define a cutout 115 at one end thereof. The cutouts 115 of the sidewalls 111 and 113 are adjacent to a same opening of the through hole 110. The cutouts 115 are each rectangular strip-shaped. The sidewalls 111 and 113 each define a first columnar groove 115a in communication with a central area of the cutout 115. In this embodiment, the columnar grooves 115a are semi-cylindrical, and extend perpendicularly to the respective sidewalls 111 and 113.

The electromagnetic coil 14 is also cubiform. The electromagnetic coil 14 is received in the through hole 110 of the receiving member 11, and is fixed to the four sidewalls 111, 112, 113, and 114.

The base 12 includes a rectangular support plate 120 and two protruding portions 122 protruding from a surface of the rectangular support plate 120. The two protruding portions 122 are respectively adjacent to two opposite edges of the rectangular support plate 120. In this embodiment, the protruding portions 122 are strip-shaped, and extend parallel to the respective edges of the rectangular support plate 120. The protruding portions 122 each define a second columnar groove 124 on a top surface thereof facing away from the rectangular support plate 120. The second columnar grooves 124 extend perpendicularly to the respective edges of the base 12 corresponding with the respective protruding portions 122. In this embodiment, the second columnar grooves 124 are semi-cylindrical. The receiving member 11 is fastened on the base 12 in such a way that the two protruding portions 122 respectively conform to and are aligned with the two cutouts 115, and the first columnar grooves 115 and the respective second columnar grooves 124 cooperatively form two whole cylindrical through holes 125.

The movable member 13 includes a panel 130, a through hole 130a defined in the center of the panel 130. Two opposite first peripheral panels 131 and two opposite second peripheral panels 132 respectively perpendicularly extend from the four peripheral sides of the panel 130 and are fastened to one another by dovetail panel joints (not shown). The panel 130, the first peripheral panels 131, and the second peripheral panels 132 cooperatively define an accommodating room 133 for accommodating an image capturing member 137. The image capturing member 137 is configured for capturing images, and includes a lens module 138 and an image sensor (not shown). The lens module 138 includes one optical lens or a number of optical lenses (not shown) for focusing light on a surface of the image sensor. The image capturing member 137 has an optical axis O substantially perpendicular to the surface of the image sensor.

The movable member 13 further includes a reinforcing block 135 and a shaft 16 formed on the outer side of each of the two first peripheral panels 131. In this embodiment, the shafts 16 are cylindrical poles, and are coaxial to each other. Each of the reinforcing blocks 135 defines a cylindrical recess 136 which generally matches the profile of the respective shafts 16. The reinforcing blocks 135 can reinforce the respective shafts 16 for preventing the shafts 16 from being broken. The shafts 16 protrude out of the respective cylindrical recesses 136. One end of each shaft 16 is inserted into the respective cylindrical through hole 125, and is supported by the respective protruding portion 122. A radius of the shaft 16 is slightly smaller than or substantially equal to that of the cylindrical through hole 125, thus the shaft 16 is rotatable in the cylindrical through hole 125 about the coaxial axis of the two shafts 16.

The camera module 10 further includes a first magnet 15a and a second magnet 15b respectively fixed to the two second peripheral panels 132. The first and second magnets 15a and 15b are respectively arranged on the outer side of the two second peripheral panels 132. In this embodiment, the first and second magnets 15a and 15b can be permanent magnets or electromagnets. The first magnet 15a and the second magnet 15b are plate-shaped, and cover most area of the respective second peripheral panels 132. The first magnet 15a has a first magnetic pole 15aa facing toward the respective second peripheral panel 132, and an opposing second magnetic pole 15ab facing away from the respective second peripheral panel 132. The second magnet 15b has a third magnetic pole 15ba facing toward the respective second peripheral panel 132, and an opposing fourth magnetic pole 15bb facing away from the respective second peripheral panel 132. The first magnet pole 15aa has an opposite polarity to that of the third magnet pole 15ba, and the second magnet pole 15ab has an opposite polarity to that of the fourth magnet pole 15bb.

The electromagnetic coil 14 is wrapped around the first peripheral panels 131 and the second peripheral panels 132, thereby forming a substantially cubiform shape. When an electric current is applied to the two terminals (not shown) of the electromagnetic coil 14, the electromagnetic coil 14 is excited to act upon the first and second magnets 15a and 15b, thereby producing a magnetic force to drive the movable member 13 to rotate about the coaxial line of the two shafts 16. That is, the optical axis O of the lens module 138 received in the movable member 13 is rotated about the coaxial line of the two shaft 16.

The image combining module 18 is configured for stitching images to obtain a panoramic image. In this embodiment, the movable member 13 is controlled by the electromagnetic coil 14 and the first and second magnets 15a and 15b to rotate to a position, and an image is captured. Then the movable member 13 is rotated to another position, and another image is captured. In like manner, a plurality of images is captured. The image combining module 18 stitches the plurality of images to obtain a panoramic image. Thus, a camera module capable of capturing wide-angle images is obtained.

It is to be understood that the shaft 16 can also be spherical, as long as it is rotatable about the coaxial line of the two shafts 16.

It is to be understood that the above-described embodiments are intended to illustrate rather than limit the disclosure. Variations may be made to the embodiments without departing from the spirit of the disclosure. The above-described embodiments illustrate the scope of the disclosure but do not restrict the scope of the disclosure.

The invention claimed is:

1. A camera module, comprising:
an image capturing member for capturing images, the image capturing member having an optical axis;
a movable member receiving the image capturing member, the movable member being rotatable about a rotation axis substantially perpendicular to the optical axis of the image capturing member;
a first magnet and a second magnet respectively fixed to opposite sides of the movable member, the first magnet and the second magnet being respectively arranged at opposite sides of the optical axis and at opposite sides of the rotation axis, two shafts respectively protruding from opposite sidewall surfaces of the movable member along the rotation axis and two reinforcing blocks respectively protruding from the opposite sidewall surfaces of the movable member, the shafts being coaxial to each other, each of the reinforcing blocks defining a recess receiving the corresponding shaft;
an electromagnetic coil wrapped around the first and second magnets for acting upon the first and second magnets, thereby producing a magnetic force to drive the movable member to rotate about the rotation axis; and
a base comprising a support plate and two protruding portions protruding from the support plate, the protruding portions each define a first groove, the shafts being respectively rotatably received in the respective first grooves.

2. The camera module of claim 1, wherein the shafts are cylindrical, the first grooves are partially cylindrical grooves, and each of the first grooves has a radius slightly greater than that of the corresponding shaft.

3. The camera module of claim 1, wherein the first magnet and the second magnet are permanent magnets.

4. The camera module of claim 1, wherein the rotation axis intersects the optical axis.

5. The camera module of claim 2, further comprising a receiving member fixed to the base, the receiving member defining two cutouts, the protruding portions respectively received in the cutouts, thereby positioning the receiving member on the base, the movable member, the first magnet, the second magnet and the electromagnetic coil being received in the receiving member.

6. The camera module of claim 2, wherein the electromagnetic coil is fixed to the receiving member.

7. The camera module of claim 3, wherein the first magnet has a first magnet pole facing toward the movable member, and a second magnet pole facing away from the movable member, the second magnet having a third magnet pole facing toward the movable member, and a fourth opposing magnet pole facing away from the movable member, the first magnet pole having an opposite polarity to that of the third magnet pole and the second magnet pole having an opposite polarity to that of the fourth magnet pole.

8. The camera module of claim 5, wherein the receiving member further includes two second grooves respectively defined in the cutouts, the second grooves being partially cylindrical, and facing toward the respective first grooves, the first grooves and the second grooves cooperatively forming two cylindrical through holes, the shafts being respectively inserted in the cylindrical through holes.

9. A camera, comprising:
a camera module including a lens module and an image sensor optically aligned with the lens module, the camera module having an optical axis;
a housing receiving the camera module therein, the housing having a top side, a first lateral side and a second lateral side, the lens module exposed at the top side, the first and second lateral sides located at opposite sides of the top side, a first magnet and a second magnet respectively fixed to two opposite sides of the camera module respectively facing toward the first and second lateral sides, the camera module rotatable relative to the housing about a rotation axis between a first position where the camera module is slanted toward the first lateral side and configured for capturing a first image, and a second position where the camera module is slanted toward the second lateral side and configured for capturing a second image, the rotation axis perpendicularly intersecting the optical axis;
an electromagnetic coil wrapped around the camera module and the optical axis, thereby forming a substantially cubiform shape around the first and second magnets for acting upon the first and second magnets, thereby producing a magnetic force to drive the camera module to rotate about the rotation axis; and
an image combining module configured for stitching the first and second images to obtain a panoramic image.

10. The camera of claim 9, further comprising a base, the base comprising a support plate and two protruding portions protruding from the support plate, the protruding portions each define a first groove, the housing further comprising two shafts respectively protruding from the first and second lateral sides thereof along the rotation axis, the shafts being coaxial to each other, the shafts being respectively rotatably received in the respective first grooves.

11. The camera of claim 10, wherein the housing further comprises two reinforcing blocks respectively protruding from the first and second lateral sides thereof, each of the reinforcing blocks defining a recess receiving the corresponding shaft.

12. A camera module, comprising:
   an image capturing member for capturing images, the image capturing member having an optical axis;
   a movable member receiving the image capturing member, the movable member being rotatable about a rotation axis substantially perpendicular to the optical axis of the image capturing member;
   a first magnet and a second magnet respectively fixed to opposite sides of the movable member, the first magnet and the second magnet being respectively arranged at opposite sides of the optical axis and at opposite sides of the rotation axis; and
   an electromagnetic coil wrapped around the movable member and the optical axis, thereby forming a substantially cubiform shape around the first and second magnets for acting upon the first and second magnets, thereby producing a magnetic force to drive the movable member to rotate about the rotation axis.

13. The camera module of claim 12, further comprising a base, the base comprising a support plate and two protruding portions protruding from the support plate, the protruding portions each define a first groove, the movable member further comprising two shafts respectively protruding from opposite sidewall surfaces thereof along the rotation axis, the shafts being coaxial to each other, the shafts being respectively rotatably received in the respective first grooves.

14. The camera module of claim 12, wherein the first magnet and the second magnet are permanent magnets.

15. The camera module of claim 13, wherein the movable member further comprises two reinforcing blocks respectively protruding from the opposite sidewall surfaces thereof, each of the reinforcing blocks defining a recess receiving the corresponding shaft.

16. The camera module of claim 13, wherein the shafts are cylindrical, the first grooves are partially cylindrical grooves, and each of the first grooves has a radius slightly greater than that of the corresponding shaft.

17. The camera module of claim 14, wherein the first magnet has a first magnet pole facing toward the movable member, and a second magnet pole facing away from the movable member, the second magnet having a third magnet pole facing toward the movable member, and a fourth opposing magnet pole facing away from the movable member, the first magnet pole having an opposite polarity to that of the third magnet pole and the second magnet pole having an opposite polarity to that of the fourth magnet pole.

18. The camera module of claim 16, further comprising a receiving member fixed to the base, the receiving member defining two cutouts, the protruding portions respectively received in the cutouts, thereby positioning the receiving member on the base, the movable member, the first magnet, the second magnet and the electromagnetic coil being received in the receiving member.

19. The camera module of claim 16, wherein the electromagnetic coil is fixed to the receiving member.

20. The camera module of claim 18, wherein the receiving member further includes two second grooves respectively defined in the cutouts, the second grooves being partially cylindrical, and facing toward the respective first grooves, the first grooves and the second grooves cooperatively forming two cylindrical through holes, the shafts being respectively inserted in the cylindrical through holes.

* * * * *